US010352559B2

(12) United States Patent
Lee et al.

(10) Patent No.: US 10,352,559 B2
(45) Date of Patent: Jul. 16, 2019

(54) GASIFICATION APPARATUS AND GASIFICATION METHOD

(71) Applicant: KOREA INSTITUE OF INDUSTRIAL TECHNOLOGY, Cheonan-si, Chungcheongnam-do (KR)

(72) Inventors: Uen Do Lee, Daejeon (KR); Won Yang, Goyang-si (KR); Young Doo Kim, Cheonan-si (KR); Tae Young Chae, Cheonan-si (KR); Chang Won Yang, Incheon (KR)

(73) Assignee: KOREA INSTITUTE OF INDUSTRIAL TECHNOLOGY, Cheonan-si, Chungcheongnam-do (KR)

(*) Notice: Subject to any disclaimer, the term of this patent is extended or adjusted under 35 U.S.C. 154(b) by 91 days.

(21) Appl. No.: 15/512,469

(22) PCT Filed: Sep. 14, 2015

(86) PCT No.: PCT/KR2015/009627
§ 371 (c)(1),
(2) Date: Mar. 17, 2017

(87) PCT Pub. No.: WO2016/043484
PCT Pub. Date: Mar. 24, 2016

(65) Prior Publication Data

US 2017/0292699 A1 Oct. 12, 2017

(30) Foreign Application Priority Data

Sep. 19, 2014 (KR) ........................ 10-2014-0124691

(51) Int. Cl.
*F23D 11/00* (2006.01)
*F23G 5/027* (2006.01)
(Continued)

(52) U.S. Cl.
CPC ............ *F23G 5/027* (2013.01); *B01J 8/1827* (2013.01); *B01J 8/44* (2013.01); *C01B 3/342* (2013.01);
(Continued)

(58) Field of Classification Search
CPC .... F23G 5/027; F23G 5/46; F23G 7/05; B01J 8/1827; B01J 8/44; C10J 3/00
(Continued)

(56) References Cited

U.S. PATENT DOCUMENTS

2011/0296759 A1* 12/2011 Roychoudhury ........ B01J 4/002 48/89
2013/0037751 A1* 2/2013 Karlsson .................. B01J 4/002 252/373

FOREIGN PATENT DOCUMENTS

JP 57-045334 A 3/1982
JP 2002-338976 A 11/2002
(Continued)

OTHER PUBLICATIONS

Deng, Weiwei, et al. "Liquid Fuel Microcombustor Using Microfabricated Multiplexed Electrospray Sources." Proceedings of the Combustion Institute, vol. 31, No. 2, 2007, pp. 2239-2246., doi:10.1016/j.proci.2006.08.080.*
(Continued)

*Primary Examiner* — Vivek K Shirsat
(74) *Attorney, Agent, or Firm* — Novick, Kim & Lee, PLLC; Jae Youn Kim

(57) ABSTRACT

The present invention relates to a gasification apparatus and a gasification method, the apparatus comprising: a reactor for gasifying fuel; a fuel supply part for supplying fuel to the reactor; and a dispersion plate for spraying fuel, so as to enhance reactivity in the reactor, and aerosolizing moisture within fuel, thereby uniformly supplying fuel to the reactor,
(Continued)

wherein the dispersion plate, in a state of being charged by receiving power, is configured to electrostatically spray fuel and a gasification agent, thereby producing a micro droplet, and atomizing the same. Accordingly, it is possible to aerosolize fuel using a boiling phenomenon or an electrostatic spray phenomenon, and uniformly supply fuel to the reactor. Also, it is possible to obtain the effect of increasing gasification reaction efficiency by preheating and reforming fuel and moisture through mid-low temperature oxidation prior to supplying the same the reactor.

12 Claims, 7 Drawing Sheets

(51) Int. Cl.

| | |
|---|---|
| ***F23G 5/46*** | (2006.01) |
| ***F23G 7/05*** | (2006.01) |
| ***B01J 8/18*** | (2006.01) |
| ***B01J 8/44*** | (2006.01) |
| ***C10J 3/00*** | (2006.01) |
| ***C01B 3/34*** | (2006.01) |
| ***C10J 3/50*** | (2006.01) |

(52) U.S. Cl.
CPC ................ *C10J 3/00* (2013.01); *C10J 3/503* (2013.01); *F23G 5/46* (2013.01); *F23G 7/05* (2013.01); *C01B 2203/025* (2013.01); *C10J 2200/12* (2013.01); *C10J 2200/152* (2013.01); *C10J 2300/0973* (2013.01); *F23G 2206/10* (2013.01); *Y02E 20/12* (2013.01)

(58) Field of Classification Search
USPC .................................................. 431/159, 161
See application file for complete search history.

(56) References Cited

FOREIGN PATENT DOCUMENTS

| | | | |
|---|---|---|---|
| KR | 10-1999-0000052 | A | 1/1999 |
| KR | 10-2010-0108300 | A | 10/2010 |
| KR | 10-2011-0075908 | A | 7/2011 |
| KR | 10-1167633 | A | 7/2012 |
| KR | 10-1180468 | B1 | 9/2012 |

OTHER PUBLICATIONS

Jido, Morio. "Burning Characteristics of Electrostatically Sprayed Liquid Fuel and Formation of Combined Droplets of Different Fuels".Conference Record of the IEEE Industry Applications Society Annual Meeting.1989. (Year: 1989).*

* cited by examiner

```
┌─────────────────────────────┐
│    Supply power to first    │──S10
│ and second dispersion plates│
└─────────────────────────────┘
              │
              ▼
┌─────────────────────────────┐
│  Supply fuel and a gasification │──S12
│   agent to a first wind box │
└─────────────────────────────┘
              │
              ▼
┌─────────────────────────────┐
│    Produce a micro droplet  │──S14
└─────────────────────────────┘
              │
              ▼
┌─────────────────────────────┐
│  Transfer heat from a reactor │──S16
│     to a second wind box    │
└─────────────────────────────┘
              │
              ▼
┌─────────────────────────────┐
│   Electrostatically spray and │
│ preheat the fuel and gasification │──S18
│   agent in the second wind box │
└─────────────────────────────┘
              │
              ▼
┌─────────────────────────────┐
│     Perform aerosolization  │──S20
└─────────────────────────────┘
              │
              ▼
┌─────────────────────────────┐
│    Perform partial oxidation │──S22
│        and gasification     │
└─────────────────────────────┘
```

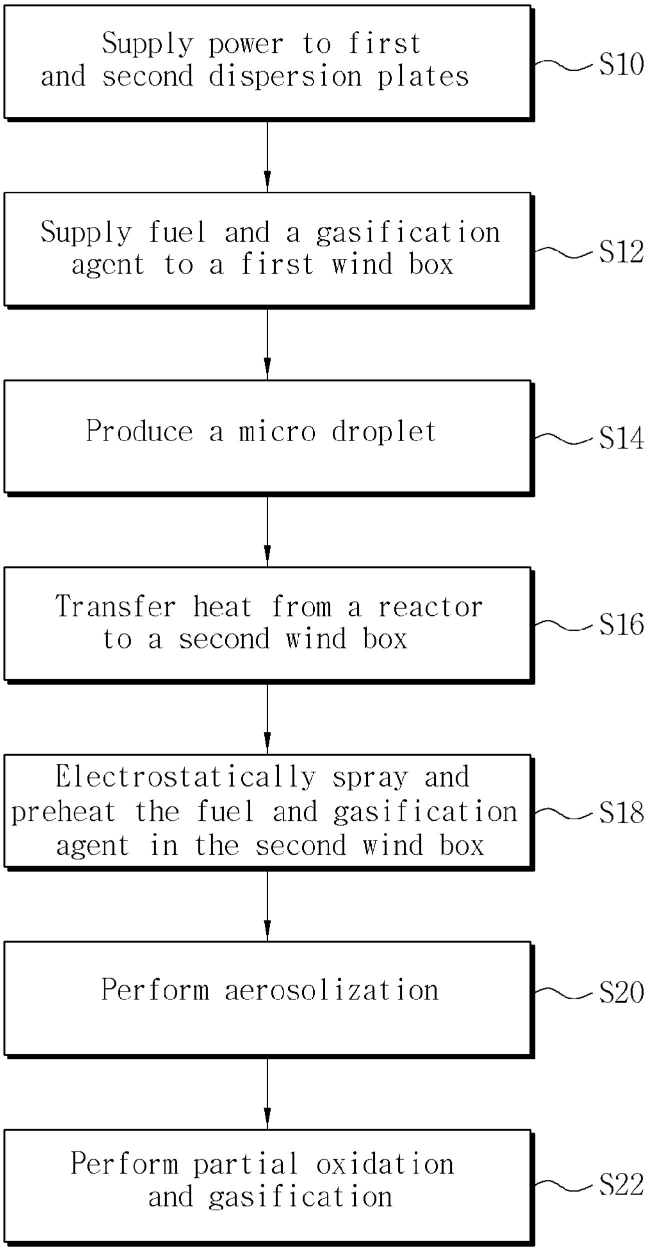

FIG.4

GASIFICATION APPARATUS AND GASIFICATION METHOD

TECHNICAL FIELD

The present invention relates to a gasification apparatus and a gasification method, and more particularly, to a gasification apparatus and a gasification method, in which low-grade oil fuel and air are preheated and supplied to a reactor of a gasifier for gasifying the fuel.

BACKGROUND ART

A technology of gasifying or cracking liquid fuel to convert the liquid fuel into other types of fuel has a relatively long history in chemical processes.

Recently, the liquid fuel is becoming more and more diversified into waste oil such as waste cooking oil, bio-pyrolysis oil obtained by pyrolyzing biomass, low-grade coal slurry and the like.

When the fuel is gasified, a synthetic gas (syngas) including carbon monoxide, hydrogen, methane and the like is obtained. In addition, when the fuel is converted with a catalyst and the like, liquid or gaseous high value-added fuel or chemical substances can be obtained.

In particular, recently, as a combined power generation (polygeneration) system that obtains various high value-added products from low-grade liquid fuel is becoming important, the gasification technology has been increasingly spotlighted.

In the case of the gasification technology, solid fuel is mainly used, and schemes such as fixed bed gasification, fluidized bed gasification, and entrained bed gasification are used for the solid fuel.

As for the entrained bed gasification, the solid fuel is gasified by pulverizing the solid fuel and performing reaction of the solid fuel with air, oxygen, steam, or a gasification agent (gasifying agent) that is a mixture of these gases.

In addition, the entrained bed gasification is mainly used for gasifying the liquid fuel. The difference between the solid fuel entrained bed gasification and the liquid fuel entrained bed gasification is that the solid fuel is pulverized and inputted, whereas the liquid fuel is atomized through a nozzle and supplied to the reactor.

In the case of fuel obtained by atomizing the liquid fuel or the solid fuel, it is very important to design a burner that sprays the fuel to allow the fuel to react with the gasification agent.

The applicant of the present invention has filed many applications such as Korean Patent Registration No. 10-1180468 (hereinafter referred to as "patent document 1") and Korean Patent Application Publication No. 10-2010-0108300 (hereinafter referred to as "patent document 2"), which disclose a multistage combustion burner and a combustion system for a gasification apparatus.

DISCLOSURE

Technical Problem

Meanwhile, as to a fluidized bed gasifier among gasifiers according to the related art, bed materials are put inside a reactor and a certain amount of air is supplied from the bottom of the reactor, so that solid or liquid bed materials may have a behavior similar to that of a fluid.

It is necessary to develop a technology for improving the gasification efficiency of the fluidized bed gasifier by atomizing and preheating fuel, and supplying the fuel to the fluidized bed gasifier.

To solve the problems described above, an object of the present invention is to provide a gasification apparatus and a gasification method, capable of improving the gasification efficiency by preheating fuel and a gasification agent, and supplying the fuel and the gasification agent to a gasifier.

Technical Solution

To achieve the object described above, according to the present invention, there is provided a gasification apparatus including: a reactor for gasifying fuel; a fuel supply part for supplying the fuel to the reactor; and a dispersion plate for spraying the fuel, so as to enhance reactivity in the reactor, and aerosolizing moisture within the fuel, thereby uniformly supplying the fuel to the reactor, wherein the dispersion plate, in a state of being charged by receiving power, is configured to electrostatically spray the fuel and a gasification agent, thereby producing a micro droplet, and atomizing the same.

In addition, to achieve the object described above, according to the present invention, there is provided a gasification method including: (a) mixing fuel with a gasification agent and electrostatically spraying the fuel and the gasification agent to produce a micro droplet; (b) preheating the produced micro droplet to aerosolize the micro droplet by using a boiling phenomenon; and (c) uniformly supplying aerosolized fuel to a reactor for gasifying the aerosolized fuel.

Advantageous Effects

As described above, according to the gasification apparatus and the gasification method of the present invention, the atomization can be promoted through the electrostatic spray phenomenon, the fuel and the moisture can be preheated before being supplied to the reactor and uniformly supplied to the reactor, and the aerosolization of the liquid fuel can be promoted due to the explosive boiling phenomenon caused by the moisture contained in the fuel, thereby promoting the gasification reaction.

In other words, according to the present invention, the heat of the reactor can be supplied to a wind box by using a heat transfer member, and the fuel can be preheated and atomized by the heat of the synthetic gas discharged from the reactor or the heat generated from the reactor, so that the atomized fuel can be supplied.

Therefore, according to the present invention, the preheated fuel can be more uniformly supplied to the reactor, so that the gasification reactivity can be improved, and the gasification reaction efficiency can be improved through the pretreatment of the fuel.

DESCRIPTION OF DRAWINGS

FIG. 4 is a flowchart for explaining a gasification method of the gasification apparatus step by step according to the preferred embodiment of the present invention.

BEST MODE

[Mode for Invention]

The gasification apparatus and the gasification method according to a preferred embodiment of the present invention will be described in detail with reference to the accompanying drawings.

In general, a gasifier and a working condition of a gasification process are determined based on the purpose of a reaction and a reaction product, and the gasification process is classified into an entrained bed gasification, a fluidized bed gasification, a moving bed gasification, and a fixed bed gasification according to a type of the gasifier.

In the present embodiment, the reactor 30 is prepared as the fluidized bed reactor.

However, it is noted that the present invention is not limited thereto, and the present invention may be modified to be applicable to various gasification types such as the entrained bed gasification, the moving bed gasification, and the fixed bed gasification.

Figure 1:
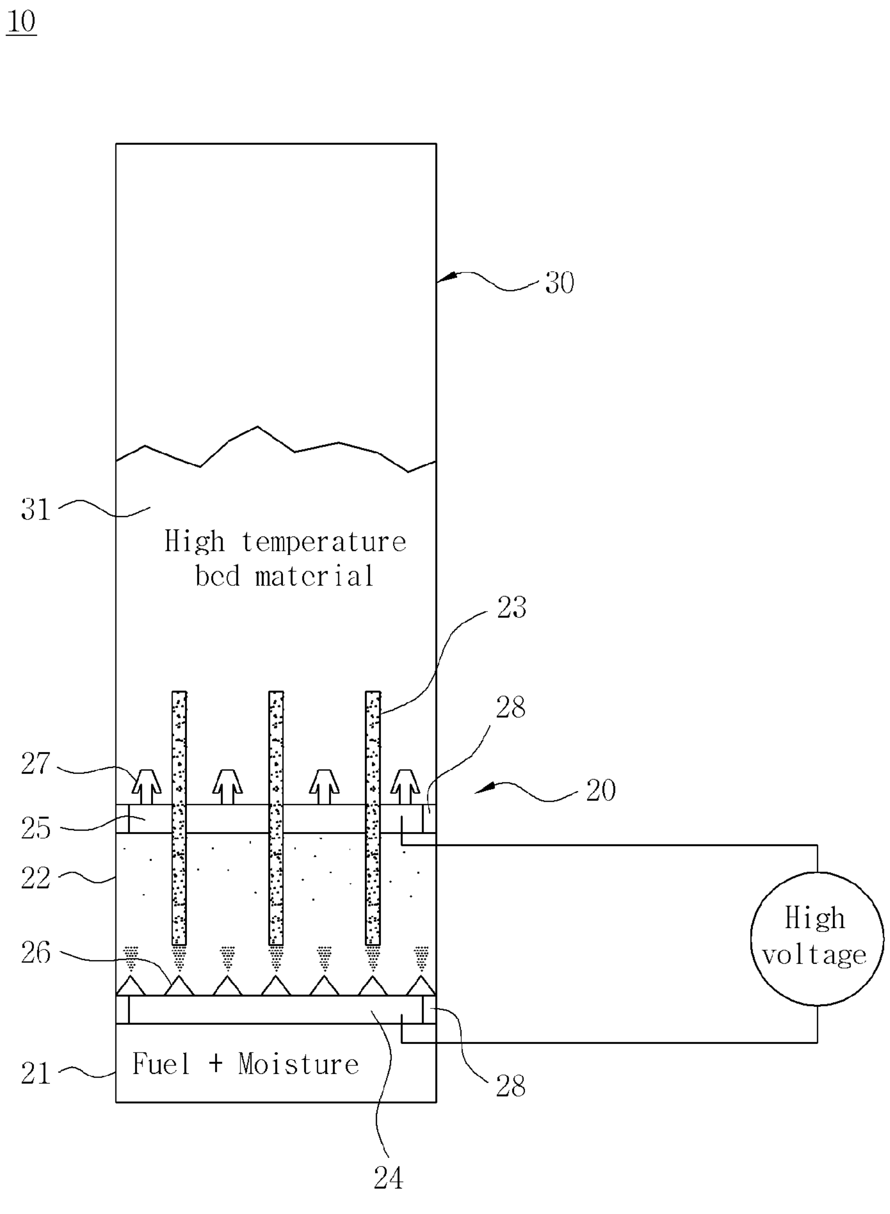
FIG. 1 is a view showing a configuration of a gasification apparatus according to a preferred embodiment of the present invention.

FIG. 1 is a schematic diagram showing a gasification apparatus according to a preferred embodiment of the present invention.

As shown in FIG. 1, the gasification apparatus 10 according to a preferred embodiment of the present invention may include a fuel supply part 20 for electrostatically spraying and preheating fuel including gasification agent and moisture to aerosolize the fuel, and a reactor 30 for partially oxidizing the aerosolized fuel to gasify the partially oxidized fuel.

Low-grade oil such as biomass pyrolysis fuel, waste cooking oil, waste lubricant, and black liquor may be used for the fuel.

The gasification agent may be a gaseous material blown-in together with fuel to gasify liquid fuel or solid slurry fuel and may include air, moisture, steam, oxygen, carbon dioxide, or mixture thereof.

In the present embodiment, the low-grade oil containing the moisture is used, so the fuel including moisture may be supplied, or the fuel mixed with a proper amount of moisture may be supplied upon necessary.

In the present embodiment, preferably, the moisture may be included in the gasification agent for use so as to aerosolize the fuel by using an explosive boiling phenomenon caused when water mixed in the fuel is heated.

The fuel supply part 20 may include a first wind box 21 for mixing the fuel with moisture in the fuel and producing a micro droplet by electrostatic spray and a second wind box 22 for aerosolizing the produced micro droplet.

The first and second wind boxes 21 and 22 may be connected to supplying pipes (not shown) for supplying the fuel and the gasification agent, respectively.

In addition, a heat transfer member 23 may be installed between the second wind box 22 and the reactor 30 to transfer heat generated in the reactor 30 to the fuel supply part 20 so as to preheat the fuel.

For example, the heat transfer member 23 may be prepared as a high temperature heat pipe.

The high temperature heat pipe serves to transfer heat of the reactor 30 operated at the high temperature of about 700° C. to about 900° C. to the second wind box 22.

Accordingly, the fuel supply part 20 may receive the heat from the reactor 30 through the heat transfer member 23, to maintain the temperature inside the second wind box 22 at a temperature of a fuel boiling point higher than a water boiling point, for example, about 100° C. to about 200° C.

Thus, the moisture supplied to the fuel supply part 20 may be mixed with the fuel in the first wind box 21, and the fuel mixed with the moisture is produced into the micro droplet by the electrostatic spay while being transferred from the first wind box 21 to the second wind box 22, and vaporized due to the explosive boiling phenomenon while being transferred from the second wind box 22 to the reactor, thereby accelerating the aerosolization of oil in the fuel.

Accordingly, the fuel is aerosolized and scattered in the second wind box 22 together with the moisture.

An aerosol signifies a state that solid or liquid fine particles are dispersed and floating in air like smoke or mist.

The aerosol particle has sufficient reactivity since it has a greater surface area relative to a volume thereof.

According to the present invention, the low-grade oil fuel is aerosolized and supplied to the gasifier by using atomization due to the electrostatic spray and the boiling phenomenon of the fuel and the moisture in the fuel, thus the fuel may be uniformly supplied into the gasifier, and easily gasified.

Meanwhile, when the fuel is charged at an appropriate temperature condition, uniform fine particles in the form of an electrostatic spray may be generated if a charge amount of the moisture and oil in the fuel is greater than surface tension.

To this end, in the present embodiment, the fuel and the moisture may be mixed with each other and filled in the first wind box 21, and a first dispersion plate 24 for producing the micro droplet in the form of an electrostatic spray may be provided between the first wind box 21 and the second wind box 22.

In addition, a second dispersion plate 25 may be provided between the second wind box 22 and the reactor 30, in which the micro droplet obtained by mixing the fuel with the moisture is uniformly supplied into the reactor 30 through the second dispersion plate 25 after the micro droplet has been preheated to be vaporized in the first wind box 21.

The first and second dispersion plates 24 and 25 may be connected to a power source so as to charge the fuel and the moisture supplied to the first wind box 21 and the gasification agent supplied to the second wind box 22.

Accordingly, the first dispersion plate 24 serves to mix and disperse the fuel and the moisture in the second wind box 22, and receive power to charge the fuel by using a potential difference between the first and second dispersion plates 24 and 25.

Figure 2:
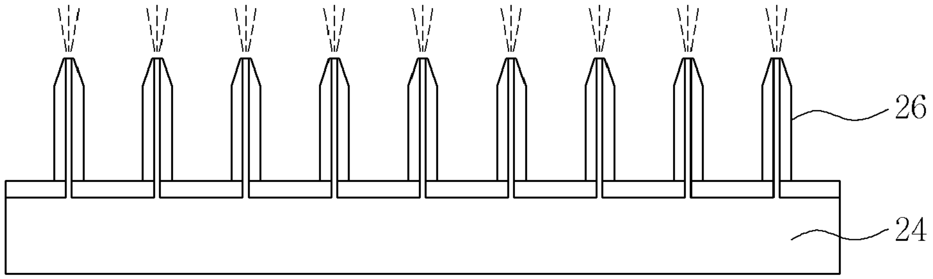
FIG. 2 is an enlarged view of a first dispersion plate shown in FIG. 1.
Figure 3:
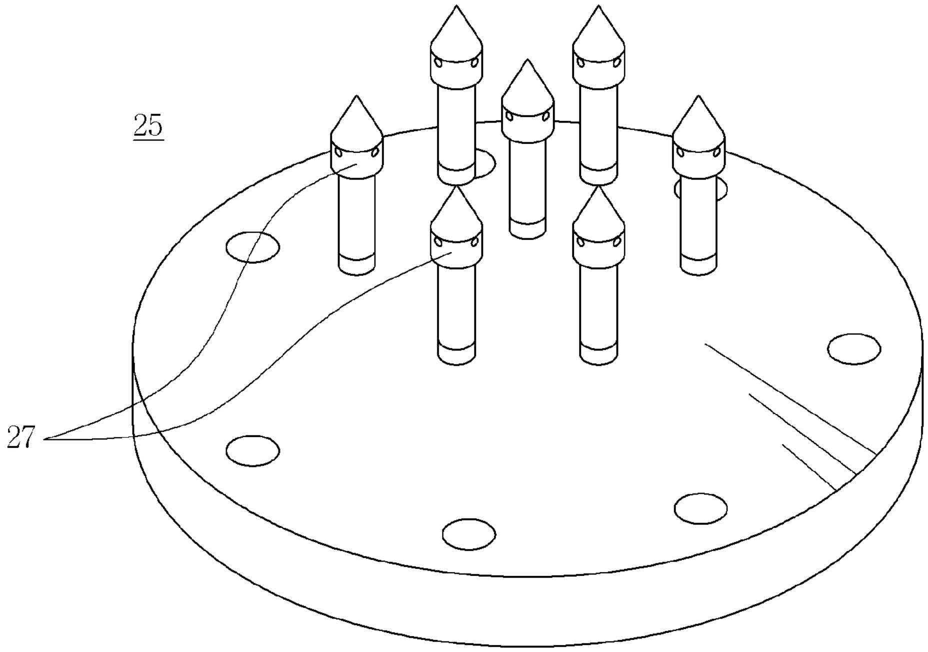
FIG. 3 is an enlarged view of a second dispersion plate shown in FIG. 1.

For example, FIG. 2 is an enlarged view of the first dispersion plate, and FIG. 3 is an enlarged view of the second dispersion plate.

As shown in FIGS. 1 and 2, the first dispersion plate 24 may be formed in a disc shape, and at least one first nozzle 26 for spraying the fuel may be installed at an upper portion of the first dispersion plate 24.

The first nozzle 26 serves to receive the power to charge the fuel and the moisture by the electrostatic spray, and to produce the micro droplet in the form of atomized spray so as to uniformly supply the micro droplet into the second wind box 22.

At this point, the first nozzle 26 may have a peak portion formed in a pointed shape to increase efficiency of the electrostatic spray by spraying the fuel from the peak portion.

In addition, as shown in FIGS. 1 to 3, at least one second nozzle 27 may be installed on the second dispersion plate 25 to uniformly disperse the fuel into the reactor 30 and prevent a counter flow of a high temperature bed material.

At this point, the second nozzle 27 may have at least one spray hole at a side of the pointed-shape peak portion to prevent the counter flow of the high temperature bed material 31 filled in the reactor 30 toward the second wind box 22.

Meanwhile, the number of the first nozzle 26 of the first dispersion plate 24 may be more than the number of the second nozzle 27 of the second dispersion plate 25 to produce a plurality of micro droplets in the first wind box 21, and power having a voltage value higher than that of power applied to the second dispersion plate 25 may be applied to the first dispersion plate 24.

In addition, the second dispersion plate 25 serves to prevent the high temperature bed material 31 provided inside the reactor 30 from penetrating into the second wind box 22, and uniformly supply the fuel and the gasification agent into the reactor 30.

Accordingly, the reactor 30 may mix and gasify the high temperature bed material 31 with the uniformly dispersed fuel, moisture and gasification agent.

At this point, the fuel inside the second wind box 22 may be uniformly aerosolized by the explosive boiling phenomenon caused by heat transferred through the heat transfer member 23 and the electrostatic spray phenomenon caused by the first nozzle 26 of the first dispersion plate 24.

Meanwhile, an insulator 28 may be installed at an outer portion of the first and second dispersion plates 24 and 25 to isolate the first and the second wind boxes 21 and 22 from the first and second dispersion plates 24 and 25, respectively.

Next, the gasification apparatus and the gasification method according to a preferred embodiment of the present invention will be described in detail with reference to FIG. 4.

FIG. 4 is a process diagram showing a gasification method of the gasification apparatus step by step according to a preferred embodiment of the present invention.

In step S10 of FIG. 4, the first and second dispersion plates 24 and 25 installed at the first and second wind boxes 21 and 22 are connected to the power supply. Thus, the power of different voltage values may be applied to the first and second dispersion plates 24 and 25, respectively.

For example, power having a voltage value higher than a voltage value of power applied to the second dispersion plate 25 may be applied to the first dispersion plate 24 to produce the micro droplet using electrostatic spray by mixing the fuel with the gasification agent.

In step S12, when the fuel and the gasification agent such as water are supplied through a supply pipe (not shown) connected to the first wind box 21, the first nozzle 26 installed on the charged first dispersion plate 24 produces the micro droplet in the form of atomized spray by electrostatically spraying the fuel and the gasification agent, and uniformly disperses the micro droplet into the second wind box 21.

At this point, the heat transfer member 23 transfers heat inside the reactor 30 to the second wind box 22 of the fuel supply part 20 (S16).

The second wind box 22 is heated to the temperature of a boiling point of the fuel or more, and the fuel and gasification agent in the form of micro droplet and supplied through the first nozzle 26 are electrostatically sprayed and uniformly dispersed into the second wind box.

After that, the water mixed in the fuel supplied to the second wind box 22 is preheated by heat transferred through the heat transfer member 23, thereby being explosively vaporized, thus oil particles in the fuel are scattered with the moisture (S18).

Meanwhile, the fuel supply 20 may supply the fuel by adding the moisture into the fuel to optimize the ratio of the fuel to the moisture, such that the fuel is more uniformly scattered.

Accordingly, the fuel supplied into the second wind box 22 is uniformly aerosolized due to the boiling phenomenon caused by heat transferred through the heat transfer member 23 and the electrostatic spray by the first dispersion plate 24 (S20).

The aerosolized fuel is uniformly supplied into the reactor 30 through the second dispersion plate 24, and the reactor 30 partially oxidizes a mixture of the uniformly aerosolized fuel and the gasification agent in the high temperature bed material 31, thereby gasifying the mixture (S22).

According to the present invention, through the processes described above, the fuel and the gasification agent are preheated by using heat of the reactor and the fuel is aerosolized by using the explosive boiling phenomenon and the electrostatic spray phenomenon, such that the fuel is uniformly supplied to the reactor.

Therefore, according to the present invention, the gasification reactivity may be improved by uniformly supplying the preheated fuel to the reactor, and the gasification reacting efficiency may be improved through a pretreatment of the fuel.

Meanwhile, the heat transfer member 23 is described in the present embodiment as being installed in the reactor 30 and the second wind box 22, however, the present invention is not limited thereto.

That is, according to the present invention, the heat transfer member 23 may be modified to supply heat to both of the first and the second wind boxes 21 and 22 upon necessary.

Figure 5:
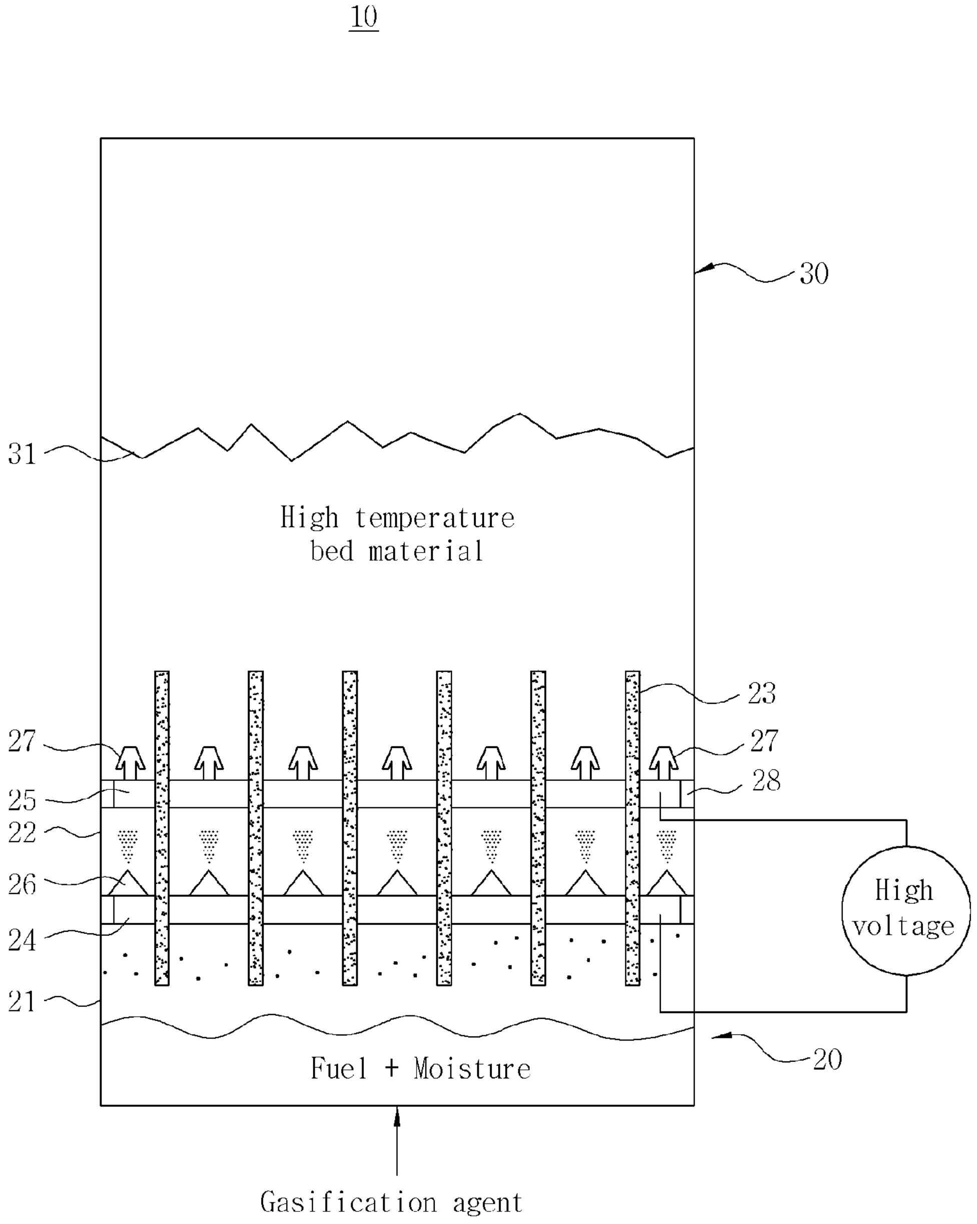
FIG. 5 is a view showing a configuration of a gasification apparatus according to another embodiment of the present invention.

For example, FIG. 5 is a schematic diagram showing a gasification apparatus according to another embodiment of the present invention.

The gasification apparatus according to another embodiment of the present invention is configured similarly to the gasifying apparatus according to the previous embodiment.

As shown in FIG. 5, it may be modified such that the heat transfer member 23 is installed extending to the first wind box 21 via the second wind box 22, and the fuel and the gasification agent supplied from the fuel supply part 20 are explosively vaporized by boiling.

At this point, the fuel and the moisture supplied to the first wind box 21 may be preferably filled up to a predetermined height preset lower than the lowest end of the heat transfer member 23 in the first wind box 22 such that the fuel and the moisture can be prevented from directly making contact with the heat transfer member 23.

Accordingly, the fuel explosively vaporized by boiling may be aerosolized due to the electrostatic spray effect caused by the charge during passing through the first dispersion plate 24.

At this point, the heat transfer member 23 extends to the first wind box 21 via an inside of the second wind box 22, thereby implementing a dual preheating effect of the fuel, moisture, and gasification agent.

In addition, the fuel aerosolized by the boiling and the electrostatic spray is uniformly supplied into the reactor 30 through the second dispersion plate 25, thereby improving the reactivity.

Therefore, the reactor 30 may mix and gasify the high temperature bed material 31 with the uniformly dispersed fuel, moisture and gasification agent.

Meanwhile, the present invention may prevent an electric leakage accident and the power loss by using the insulator installed between the first and second dispersion plates charged for the electrostatic spray and an outer wall of the reactor.

According to the present invention, the explosive boiling phenomenon of the moisture due to the heat transferred by the heat transfer member 23 may be implemented at the first wind box 21 as well as the second wind box 22.

The above embodiment describes that boiling phenomenon caused by preheating using the heat transfer member 23 and the electrostatic spray phenomenon caused by the charged dispersion plates 24 and 25 are used, however, the present invention is not limited thereto.

That is, the present invention may be modified to provide only one of the heat transfer member and the dispersion plate to use the boiling phenomenon only, or the electrostatic spray phenomenon only.

Further, the present invention may be modified to atomize the fuel and the moisture by using the electrostatic spray phenomenon in a process of supplying the fuel to the reactor instead of atomizing the fuel and the moisture by using the electrostatic spray phenomenon inside the wind box.

In addition, the present invention may be modified to provide only one wind box installed therein with the dispersion plate instead of installing the dispersion plates at a pair of wind boxes, respectively, or modified to provide the dispersion plate to the reactor such that the fuel containing the gasification agent and the moisture supplied from one wind box can be electrostatically sprayed to the reactor and gasified through the preheating and aerosolizing.

Figure 6:
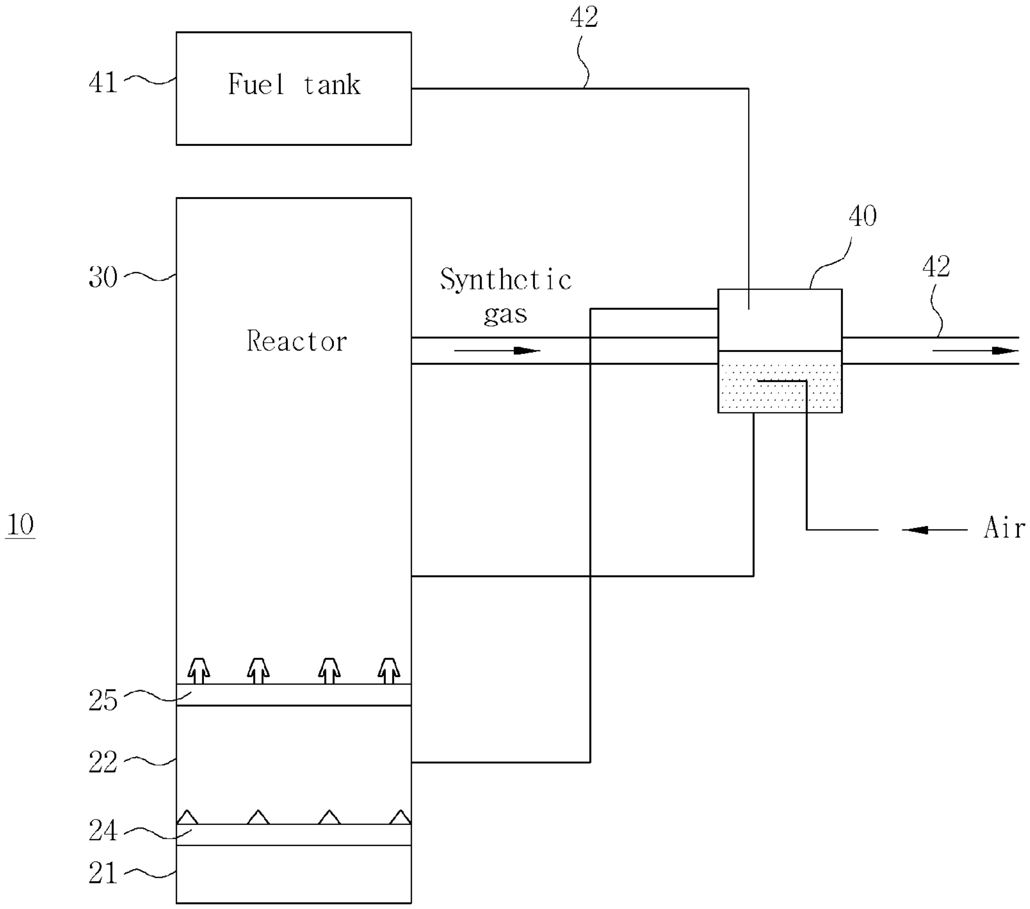
FIG. 6 is a view showing a configuration of a gasification apparatus according to still another embodiment of the present invention.

In addition, the present invention may change the number of the wind box as needed, and supply the heat by installing the heat transfer member 23 at a partial or entire portion of the modified wind box. FIG. 6 is a schematic diagram showing a gasification apparatus according to still another embodiment of the present invention.

As shown in FIG. 6, the gasification apparatus 10 according to the still another embodiment of the invention is configured similarly to the gasification apparatus 10 according to the above embodiments. However, the gasification apparatus 10 may include a preheating part 40 instead of the heat transfer member 23 for preheating the fuel by collecting the heat of synthetic gas.

The preheating part 40 serves as a heat exchanger for temporarily storing the fuel supplied from a fuel tank 41, collecting the heat of the synthesis gas preheating, and preheating the temporarily stored fuel.

To this end, the preheating part 40 may be installed on a discharge line 42 for discharging the synthetic gas from the reactor 30, and a supply line 43 for receiving the fuel from the fuel tank 41 may be connected to one side of the preheating part 40.

At this point, the preheating unit 40 may preheat the fuel stored therein to a preset reference temperature range, for example, about 100° C. to about 200° C. so as to correspond to a boiling point of the fuel higher than a boiling point of water.

An air supply pipe for supplying air to form bubbles may be connected to the first wind box 21 of the fuel supply unit 20 or the preheating part 40.

According to the present invention, the bubbles are formed inside the wind box or the preheating part, fuel prepared as low-grade oil is mixed with the air and supplied to the dispersing plate, and the fuel is sprayed to the air inside the wind box by using vapor pressure changed in the process of bubbling the preheated fuel, thus the fuel is uniformly supplied.

Table 1 shows a result of gasification properties of an original specimen of low-grade oil and a mid-low temperature oxidation specimen which is oxidized at a mid-low temperature through preheating and bubbling the original specimen, in which the gasification properties are measured at the gasification apparatus according to the still another embodiment of the invention.

TABLE 1

| | Air mixture ratio | | | |
|---|---|---|---|---|
| | 0.27-0.28 | | 0.34-0.35 | |
| Fuel | original specimen | mid-low temperature oxidation specimen | original specimen | mid-low temperature oxidation specimen |
| Hydrogen ($H_2$) | 10.59 | 14.29 | 9.61 | 12.74 |
| Carbon monoxide (CO) | 11.19 | 17.56 | 10.57 | 15.13 |

Table 1 shows gasification properties of the original specimen of low-grade oil and the mid-low temperature oxidation specimen in the case that the ratio of air to fuel supplied to an ignition source (the equivalence ratio) is about 0.27 to about 0.28, or about 0.34 to about 0.35.

When forming a condition for the mid-low temperature oxidation by preheating the original specimen of the low-grade oil to the temperature of about 100° C. to about 200° C., and supplying proper air through the bubbling, gasification reactivity is improved due to the reforming by the chemical changes of the fuel and oxygenation representing an increase of oxygen ($O_2$) in the fuel.

Accordingly, as described in Table 1, it can be found that the composition of hydrogen ($H_2$) and carbon monoxide (CO), which are major components in synthetic gas, is increased in the synthetic gas that is obtained by gasifying the original specimen of the low-grade oil after oxidizing the original specimen of the low-grade oil at the mid-low temperature.

Therefore, according to the present invention, the heat of the synthetic gas discharged from the reactor is collected to preheat the fuel, a portion of oxidant is supplied to the preheated fuel in a form of bubble, thus the fuel is oxidized at the mid-low temperature, thus a portion of the fuel is reformed or supplied to the reactor in the form of oxygenated fuel, so that gasification reactivity may be improved.

Figure 7:
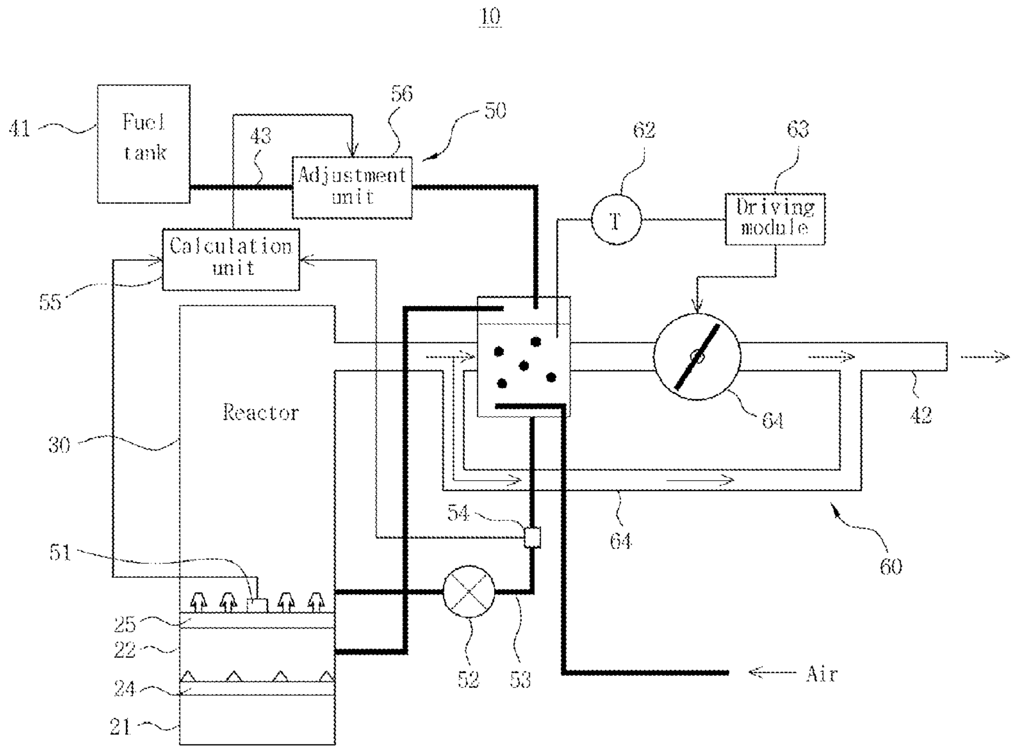
FIG. 7 is a view showing a configuration of a gasification apparatus according to yet another embodiment of the present invention.

FIG. 7 is a schematic diagram showing a gasification apparatus according to further still another embodiment of the present invention.

As shown in FIG. 7, the gasification apparatus 10 according to the still another embodiment of the invention is configured similarly to the gasification apparatus shown in FIG. 6, and may further include a fuel amount adjustment part 50 for adjusting an amount of fuel stored in the preheating part 40.

The fuel amount adjustment part 50 may include a first pressure sensor for sensing pressure of a lower portion of the reactor 30, a pumping unit 52 for performing a pumping operation to supply the fuel preheated at the preheating part 50 to the reactor 30, a second pressure sensor 54 for sensing pressure of the fuel supplied from the preheating part 40 to the reactor 30 through a fuel supply line 53 by the pumping operation of the pumping unit 52, a calculation unit 55 for calculating an amount of the fuel stored in the preheating part 40 by using a pressure difference sensed from the first and second pressure sensors 51 and 54, and an adjustment unit 56 for adjusting the flow rate of the fuel supplied to the preheating part 40 from the fuel tank 41 based on the calculated fuel amount.

Further, the gasification apparatus 10 according to the still another embodiment of the invention may further include a gas flow rate adjustment part 60 for adjusting the flow rate of the synthetic gas discharged via the preheating part 40 to control a temperature of the fuel preheated at the preheating part 40, so as to prevent the fuel stored in the preheating part 40 from being overheated.

The gas flow rate adjustment part 60 may include an open/close module 61 connected a rear end of the preheating part 40 on a discharging line 42 and operated in an opened/closed state to control the flow rate of the synthetic gas discharged via the preheating part 40, a temperature sensor 62 for sensing a temperature of the fuel preheated at the preheating part 40, a driving module 63 for driving the open/close module 61 based on the temperature sensed at the temperature sensor 62, and a bypass line 64 for bypassing the synthetic gas discharged via the discharging line 42.

The driving module 63 may compare the temperature of the fuel preheated at the preheating part 40 with a preset reference temperature, and drive the open/close module 61 to control an opening degree of the discharging line 42 based on the comparison result.

The bypass line 64 may branch from the discharging line 42 between the reactor 30 and the preheating part 40 and may be joined with the discharging line 42 at a rear end of the open/close module.

The bypass line 64 serves to normally discharge the synthetic gas when the opened/closed module 61 is closed.

Although this embodiment describes that the preheating part 40 is prepared on the supply line 43 for supplying the fuel to the reactor 30, the preheating part 40 may be modified to be prepared in the reactor 30 to use heat generated in a gasification operating process and preheat the fuel so as to supply the fuel to the reactor 30.

In addition, an atomizing sequence and an aerosolization sequence of the present invention may be modified to improve the gasification reactivity.

Further, an operating temperature of the reactor 30 may be modified to be maintained at a temperature upon gasification operation such as about 700° C. to about 900° C. by using heat generated from the reactor 30.

In addition, the present invention may be modified to install the dispersion plate in one wind box, prepare the preheating part at the inside or outside of the reactor to preheat the fuel, or maintain the operating temperature of the reactor upon the gasification operation by using the heat of the reactor.

The present invention implemented by the inventor is described in detail according to several embodiments, however, the present invention is not limited to the above embodiments and various modifications are available within the scope of the invention without departing from the concept of the invention.

INDUSTRIAL APPLICABILITY

The present invention can be applied to a gasification apparatus technology that improves gasification reactivity by uniformly supplying fuel to a reactor through atomization using an electrostatic spray phenomenon and a boiling phenomenon of preheating the fuel and the gasification agent when the fuel is supplied to the reactor.

The invention claimed is:

1. A gasification apparatus comprising:

a reactor;

a fuel supply part for supplying fuel to the reactor; and a dispersion plate for spraying the fuel and aerosolizing moisture contained in the fuel to uniformly supply the fuel to the reactor so as to enhance reactivity in the reactor, wherein the dispersion plate electrostatically sprays the fuel together with a gasification agent to produce and atomize a micro droplet when the dispersion plate is electrically charged, wherein a temperature inside the fuel supply part is maintained at a temperature of a fuel boiling point higher than a water boiling point, wherein the dispersion plate includes a first dispersion plate and a second dispersion plate, wherein the fuel supply part includes a first wind box for mixing the fuel with the gasification agent to produce the micro droplet by an electrostatic spraying, and a second wind box for aerosolizing the fuel and the gasification agent mixed in the first wind box, wherein the first and second dispersion plates are respectively disposed in the first and second wind boxes and are connected to a power source so as to be electrically charged, and wherein a first and a second nozzles are respectively disposed on the first and second dispersion plates, and the first nozzle sprays the fuel and the gasification agent into the second wind box and the second nozzle sprays the fuel and the gasification agent into the reactor.

2. The gasification apparatus of claim 1, further comprising a preheating device for preheating the fuel supplied to the fuel supply part, wherein the preheating device includes a heat transfer member for supplying heat generated from the reactor to one of the first and second wind boxes of the fuel supply part.

3. The gasification apparatus of claim 1, further comprising a preheating device for preheating the fuel supplied to the fuel supply part, wherein the preheating device includes a preheating part for collecting heat of a synthetic gas discharged from the reactor to preheat the fuel by using the collected heat, and supplying the preheated fuel to the reactor or one of the first and second wind boxes.

4. The gasification apparatus of claim 3, further comprising:

a fuel amount adjustment part for adjusting an amount of the fuel supplied to the preheating part according to differential pressure between an inside of the reactor and the fuel supplied from the preheating part to the reactor so as to constantly maintain an amount of fuel stored in the preheating part; and a gas flow rate adjustment part for adjusting a flow rate of the synthetic gas discharged through the preheating part so as to maintain a temperature of the preheating part within a predetermined reference temperature range.

5. A gasification method using a gasification apparatus including a fuel supply part and a dispersion plate for supplying fuel to a reactor, the method comprising:

(a) mixing the fuel with a gasification agent and electrostatically spraying the fuel together with the gasification agent to produce and atomize a micro droplet;

(b) preheating the produced micro droplet to aerosolize the micro droplet by using a boiling phenomenon; and (c) uniformly supplying the aerosolized fuel to the reactor for gasifying the aerosolized fuel, wherein a temperature inside the fuel supply part is maintained at a temperature of a fuel boiling point higher than a water boiling point, wherein the dispersion plate includes a first dispersion plate and a second dispersion plate, wherein the fuel supply part includes a first wind box for mixing the fuel with the gasification agent to produce the micro droplet by an electrostatic spraying, and a second wind box for aerosolizing the fuel and the gasification agent mixed in the first wind box, wherein the first and second dispersion plates are respectively disposed in the first and second wind boxes and are connected to a power source so as to be electrically charged, and wherein a first and a second nozzles are respectively disposed on the first and second dispersion plates, and the first nozzle sprays the fuel and the gasification agent into the second wind box and the second nozzle sprays the fuel and the gasification agent into the reactor.

6. The gasification method of claim 5, wherein step (b) includes transferring heat generated during a gasification operation of the reactor to the first and second wind boxes disposed in the fuel supply part by using a heat transfer member so as to preheat the fuel and the gasification agent.

7. The gasification method of claim 5, wherein the atomization process of step (a) and the aerosolization process of step (b) are interchangeable to enhance gasification reactivity.

8. The gasification method of claim 5, wherein step (b) includes transferring heat generated during a gasification operation of the reactor to the first wind box disposed in the fuel supply part so as to preheat the fuel, and supplying the preheated fuel to the reactor or the second wind box.

9. The gasification method of claim 5, wherein step (b) includes collecting heat of a synthetic gas discharged from the reactor to preheat the fuel by using the collected heat, and supplying the preheated fuel to the reactor.

10. The gasification method of claim 5, wherein step (b) includes preheating the fuel in a preheating part connected to the reactor by using heat generated during a gasification operation of the reactor, and supplying the preheated fuel to the reactor.

11. The gasification method of claim 5, wherein step (b) includes maintaining a temperature of the reactor at an operation temperature by using heat generated from the reactor during a gasification operation of the reactor.

12. The gasification method of claim 5, wherein step (a) includes reforming a portion of the fuel through a mid-low temperature partial oxidation process, and supplying air to the first wind box disposed in the fuel supply part or a preheating part connected to the reactor to form bubbles so as to increase gasification efficiency by allowing the fuel to contain oxygen.

* * * * *